May 12, 1964 W. R. MILLER 3,133,237
ROTARY CONVERTER FED MOTOR CONTROL FOR A VEHICLE
Filed April 11, 1962 5 Sheets-Sheet 1

INVENTOR.
WILLIAM R. MILLER
BY Robert H Montgomery
HIS ATTORNEY

May 12, 1964 W. R. MILLER 3,133,237
ROTARY CONVERTER FED MOTOR CONTROL FOR A VEHICLE
Filed April 11, 1962 5 Sheets-Sheet 2

INVENTOR.
WILLIAM R. MILLER
BY

May 12, 1964   W. R. MILLER   3,133,237
ROTARY CONVERTER FED MOTOR CONTROL FOR A VEHICLE
Filed April 11, 1962   5 Sheets-Sheet 3
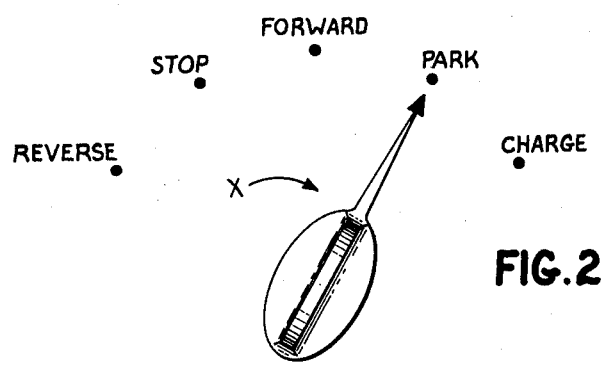
FIG.2
| SELECTOR POSITION | CONTACTS | | | | | | | |
|---|---|---|---|---|---|---|---|---|
| | $X_1$ | $X_2$ | $X_3$ | $X_4$ | $X_5$ | $X_6$ | $X_7$ | $X_8$ |
| REVERSE | X | X | O | O | O | O | X | X |
| STOP | X | X | X | X | O | O | O | O |
| FORWARD | X | X | O | O | X | X | O | O |
| PARK | X | X | X | X | O | O | O | O |
| CHARGE | O | O | X | X | O | O | O | O |
FIG.3
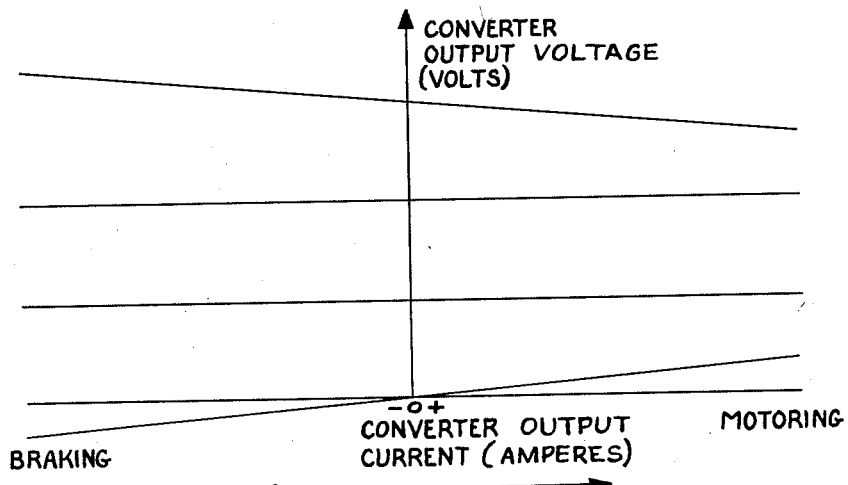
FIG.4
INVENTOR.
WILLIAM R. MILLER
BY Robert H Montgomery
HIS ATTORNEY May 12, 1964 W. R. MILLER 3,133,237
ROTARY CONVERTER FED MOTOR CONTROL FOR A VEHICLE
Filed April 11, 1962 5 Sheets-Sheet 4

INVENTOR.
WILLIAM R. MILLER
BY
*Robert H Montgomery*
HIS ATTORNEY

United States Patent Office 3,133,237
Patented May 12, 1964

---

3,133,237
ROTARY CONVERTER FED MOTOR CONTROL
FOR A VEHICLE
William R. Miller, Erie, Pa., assignor to General Electric
Company, a corporation of New York
Filed Apr. 11, 1962, Ser. No. 186,765
7 Claims. (Cl. 318—145)

This invention relates to electrically powered vehicles and more particularly relates to self-powered electrical vehicles of the type carrying a source of electric power.

Vehicles powered from self-carried sources of electric current such as a battery are used in many industrial applications requiring frequent stopping and starting, such as lift trucks, delivery vehicles, etc. Vehicles of this type commonly use a resistance in series with the battery and the traction motor(s) which are geared to an axle to control the speed of the vehicle, the resistance being cut out or inserted in steps to control the voltage applied to the traction motors, and hence the speed of the vehicle. This type of electric vehicle system requires large electrical contactors for shunting and breaking shunts about segments of the series resistance when accelerating or decelerating. These contactors are expensive and are high maintenance items and the series resistance produces a waste of power at low vehicle speeds and when the vehicle is accelerating. Additionally, since the traction motor voltage is changed in steps, acceleration and deceleration of the vehicle may not be smooth.

A recognized problem in battery powered vehicles is reversal of direction of the vehicle while it is in motion, frequently referred to as plugging. If a vehicle operator moves his controls to reverse the direction of vehicle motion or to stop the vehicle while it is in motion by reversing motor connections, the counter electromotive force of the traction motor and the battery voltage are placed in series and large "plugging" currents flow in the motor circuit which are likely to damage the motor if the plugging current is not suitably limited. Furthermore, this plugging of a vehicle causes an abrupt stop which may cause injury to the operator and/or damage to material being carried by the vehicle.

In view of the aforementioned deficiencies and limitations of presently known electric vehicles, this invention provides a new and improved vehicle electric propulsion system wherein traction motor voltage may be steplessly varied from zero to a maximum value using a controllable rotating direct current (D.C.) transformer. The invention further provides an anti-plugging arrangement which prohibits plugging, even though the operator attempts to reverse the vehicle while it is in motion, until the vehicle speed decreases to a predetermined value and which regeneratively brakes the vehicle at a programmed rate, when the controls are reversed, until the vehicle speed decreases to the predetermined value. Programmed regenerative braking is also available when slowing or stopping the vehicle. The invention also provides maximum utilization of electric power source when the vehicle is operating under heavy load by sensing the peak power output of the battery and regulating the motor voltage in accordance therewith.

Accordingly, it is an object of this invention to provide a new and improved electrically powered industrial vehicle electric system wherein vehicle speed may be varied steplessly from zero to a maximum speed through use of a rotating direct current converter.

It is a further object of this invention to provide a new and improved anti-plugging arrangement for an electrically powered vehicle wherein the motor circuit cannot be reversed until the vehicle speed decreases to a predetermined value regardless of an operator's manipulation of the controls.

It is a further object of this invention to provide a new and improved electric propulsion system for an industrial type vehicle wherein the vehicle may be regeneratively braked at a programmed rate whenever speed is commanded to be decreased.

It is a still further object of this invention to provide a new and improved electric propulsion system for an industrial type vehicle wherein the vehicle is automatically regeneratively braked at a programmed rate if the operator should call for reversal of direction while the vehicle is in motion, and the vehicle is prohibited from reversing until the vehicle speed decreases to a predetermined value.

It is another object of this invention to provide a new and improved electric propulsion system for a battery powered vehicle wherein the maximum power output of the power source may be sensed and held at that point when the vehicle is operating under heavy load conditions.

Briefly stated, the invention in one form thereof comprises a battery used as a power source which drives a direct current rotary converter which in turn furnishes a voltage to a traction motor. The converter is adapted to supply a stepless variable voltage dependent upon the excitation of a control field therein. The converter is adapted to supply regenerative energy at a programmed rate to the battery during coasting or deceleration of the vehicle. An additional series field is provided on the converter to carry braking current and program regenerative braking of the vehicle in accordance with the braking current. When the operator's controls are manipulated to reverse the direction of the vehicle, the speed of the traction motor is sensed and prohibits the motor circuits from reversing until the motor speed decreases to a predetermined value while the vehicle is automatically regeneratively braked. Means are further provided to sense the point of maximum power output of the primary source and to regulate the power supplied to the traction motor at this point to gain maximum utilization of the primary source when the vehicle is under conditions of heavy load.

The novel features of the invention are pointed out with particularity in the claims appended to and forming part of this application. The invention, however, both as to its organization and operation, together with further objects and advantages thereof may best be understood by reference to the following description taken in conjunction with the following drawings wherein:

FIG. 2 illustrates a selector switch utilized in controlling circuit contacts of FIG. 1;

FIG. 3 is a chart showing the sequence of contact closing under control of the selector switch of FIG. 2;

FIGS. 4 and 5 are graphical representations of the electrical characteristics of a rotating direct current voltage converter as utilized in the invention;

Figure 1:
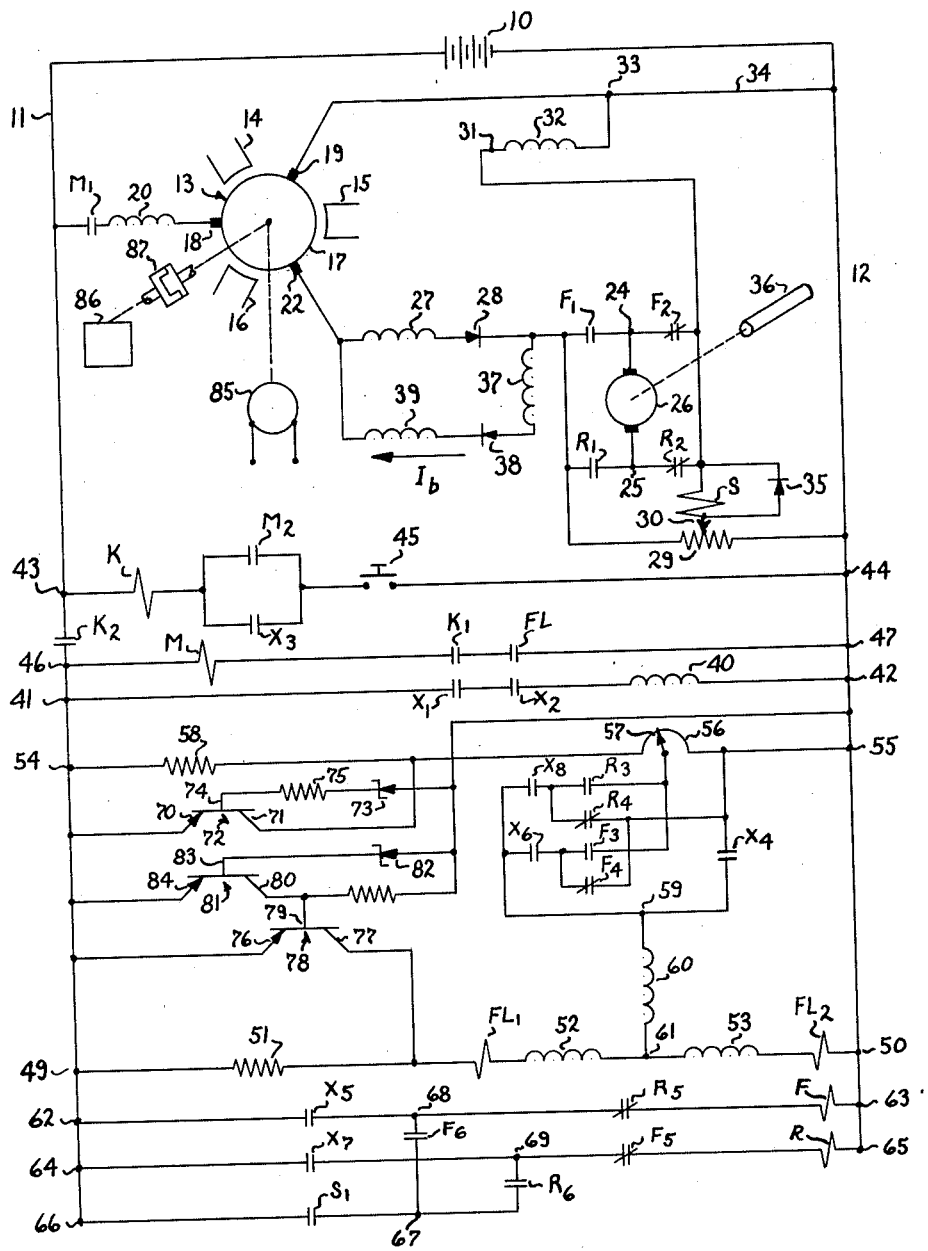
FIGS. 1 and 1A illustrate schematically a diagram of an electrical vehicle propulsion system embodying the invention.
Figure 1A:
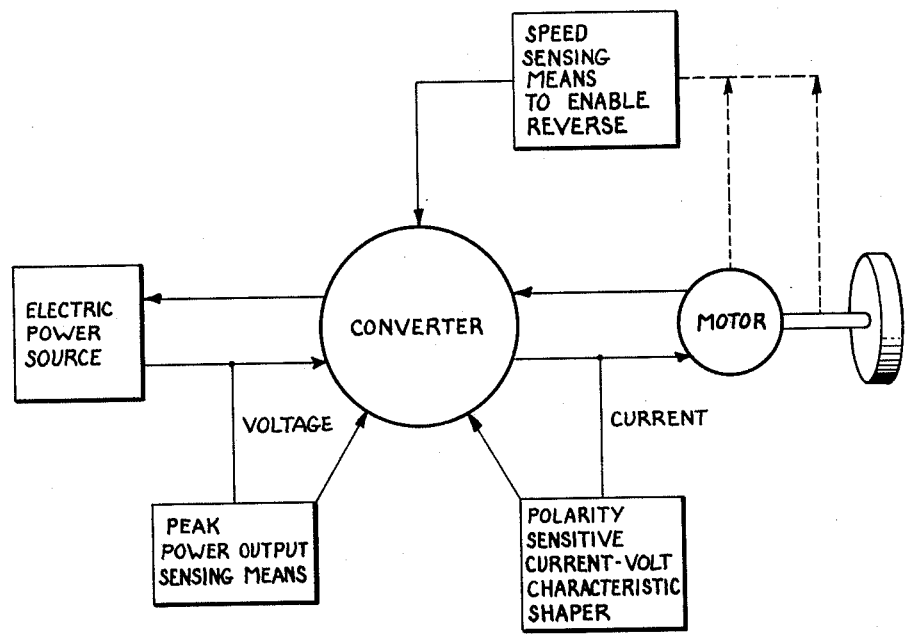

Reference is now made to FIG. 1 which illustrates as a source of electric power, battery 10 connected between positive line 11 and negative line 12. Connected across lines 11 and 12 are the motoring terminals of a direct current rotory converter 13 which may also be termed a rotating direct current (D.C.) transformer. The function of converter 13 is to provide a controllable variable direct current voltage from a source of fixed voltage rating.

The converter 13 is selected to be of the type having 3p poles, where p is an integer, and p poles are common to both the input or motoring circuit and the generating or output circuit. A machine of this type is generally described in Patent Re. 22,907. The converter, for simplicity of description, will be considered as having three poles, motoring pole 14, common pole 15, and generator pole 16. Power is normally applied to the converter armature 17 through line or input brush terminal 18 and negative or common brush terminal 19 connected between lines 11 and 12 respectively. A series field coil 20 on pole 16 and main line contact $M_1$ under control of relay coil M are connected between line 11 and brush terminal 18. The converter 13 further includes commutating poles and windings thereon which, for simplicity of illustration, are not shown.

Under normal operating conditions an output voltage is derived from between output brush terminal 22 and common brush terminal 19. This output voltage is applied across the armature terminals 24, 25 of traction motor 26 through a pair of so-called broken back contacts $F_1$, $F_2$ and $R_1$, $R_2$ under control of forward and reverse relay coils F and R, all respectively. In the illustrated embodiment of the invention, relays F and R control other contacts $F_3$, $F_4$, $F_5$, $F_6$, $R_3$, $R_4$, $R_5$ and $R_6$. The contacts $F_3$ and $F_5$, located in the control portion of the circuit, hereinafter described, are interlocks on line contact $F_1$. Contacts $F_4$ and $F_5$ are interlocks on line contact $F_2$. Contacts $R_3$ and $R_6$ are interlocks on line contact $R_1$. Contacts $R_4$ and $R_5$ are interlocks on line contact $R_2$. The forward and reverse relay contactor arrangement is such that when coil F is energized, contacts $F_1$, $F_3$ and $F_6$ close and $F_2$, $F_4$ and $F_5$ open, and vice versa. When relay coil R is energized, contacts $R_1$, $R_3$ and $R_6$ close and $R_2$, $R_4$ and $R_5$ open, and vice versa. Connected between armature terminal 24 and brush 22 is series field 27 of motor 26 which is polarized by unidirectional conducting device 28 for reasons hereinafter explained. The series field 27 may be divided into several parallel portions with associated unidirectional conducting devices in accordance with the magnitude of the motor armature current. Connected across the armature of motor 26 and line 12 is a potentiometer 29 having an adjustable tap 30 thereon connecting a motor speed-sensing relay coil S between potentiometer 29 and a terminal 31 of series field 32 on pole 14 of converter 13. The other terminal 33 of series field 32 is connected to negative line 12 through line 34. A free wheeling diode 35 is connected across coil S. The connection of the potentiometer 29 and tap 30 thereon will be recognized as a circuit for measuring the counter electromotive force of traction motor 26, by providing IR compensation, and hence its speed of rotation. The traction motor 26 is connected to drive an axle 36 of a vehicle, not shown, through a suitable gearing arrangement, not shown.

Motor 26 is provided with a second series field 37 which is polarized by unidirectional conducting device 38 and is connected to a series field 39 of converter 13 and converter output terminal 22. The motor series field 37 and converter series field 39 are operative only during regenerative braking of the vehicle, as hereinafter explained.

Shunt field 40 of motor 26 is connected across lines 11 and 12 between terminals 41 and 42 in series with contacts $X_1$ and $X_2$. The contact or switches $X_1$ and $X_2$ may be controlled by a multiple position selector switch X, as illustrated in FIG. 2, together with contacts $X_3$-$X_8$ which are opened and closed through selector switch X by the vehicle operator in accordance with a desired operating condition. A sequence chart for contacts $X_1$-$X_8$ in accordance with various vehicle operating conditions is shown in FIG. 3. Serially connected across lines 11 and 12 between terminals 43 and 44 is coil K of a control power relay, a parallel arrangement of contact $M_1$ controlled by relay coil M and contact $X_3$ of selector switch X, and off-on switch 45, which may be a key type switch which the vehicle operator closes to initiate operation of the vehicle. Connected across lines 11 and 12 between terminals 46 and 47 is a main line relay coil M of main line contact relay 21 in series with contacts $K_1$ and FL. Contact $K_1$ is controlled by control power relay K and contactor FL is controlled by field loss relay coils $FL_1$ and $FL_2$, as hereinafter more fully explained. In line 11 between terminals 43 and 46 is contactor $K_2$ controlled by control power relay coil K. Connected across lines 11 and 12 between terminals 49 and 50 is a series circuit comprising a resistance 51, shunt field 52 on motor pole 14 of converter 13, field loss relay coil $FL_1$, shunt field 53 on common pole 15 and field loss relay coil $FL_2$. Connected across lines 11 and 12 at terminals 54 and 55 is a potentiometer 56 having a movable contact arm 57 thereon. The position of contact arm 57 determines the speed of the vehicle by controlling the excitation of the output circuit of converter 13 and may be connected to a foot pedal, not shown, operable by the vehicle operator. A resistance 58 is connected between potentiometer 56 and terminal 54, as hereinafter explained. Contact arm 57 is connectable through contacts $R_3$, $X_8$ and $F_3$, $X_6$ to terminal 59 of control field 60 which has its other terminal connected at point 61 between motoring field 52 and common field 53 of converter 13. Connected between lines 11 and 12 at terminals 62 and 63 is contact $X_5$, contact $R_5$ and forward relay coil F. Connected between lines 11 and 12 at terminals 64 and 65 are contact $X_7$, contact $F_5$ and relay coil R. Connected between terminal 66 on line 11 and a terminal 67 is a contact $S_1$ under the control of motor speed-sensing relay coil S. Connected between terminal 67 and point 68 between contacts $X_5$ and $R_5$ is contact $F_6$. Connected between terminal 67 and point 69 is contact $R_6$.

Resistance 58 is shunted by the emitter 70—collector 71 circuit of transistor 72. It will be noted that a Zener diode 73 is connected to the base 74 of transistor 72 and is so arranged that so long as the voltage at line 11 is above the breakdown value of the Zener diode 73 as modified by resistance 75, current will flow from line 11 through the emitter-collector circuit of transistor 72 and potentiometer 56 bypassing resistance 58. This circuit arrangement contributes to most efficient utilization of battery power, as hereinafter explained. Connected across resistance 51 is the emitter 76—collector 77 circuit of transistor 78. The base 79 of transistor 78 is connected to the collector 80 of transistor 81. A Zener diode 82 is connected between the base 83 of transistor 81 and line 12. Transistor 78 is normally conductive to bypass current from line 11 about resistance 51 and transistor 81 is normally non-conductive, thereby placing a forward bias on base 79 of transistor 78. If the voltage at line 11 should rise above a predetermined value which will cause Zener diode 82 to break down and conduct current from the emitter 84—base 83 circuit of transistor 81, a positive going signal will be applied to base 79 of transistor 78 to bias transistor 78 in the turn-off direction and decrease current flow in fields 52 and 53 for reasons hereinafter explained.

*Operation*

The operation of the circuit thus far explained will now be described. Assume that the vehicle is at rest and the rotary selector switch is in the "stop" or "park" position. It may be seen that contacts $X_1$, $X_2$, $X_3$ and $X_4$ are closed. If the operator should now close switch 45, control power relay coil K will become energized and pick up contacts $K_1$ and $K_2$. When contact $K_2$ picks up, a voltage is placed across terminal 49 of line 11 and terminal 50 of line 12, thus energizing field loss relays $FL_1$, $FL_2$, motor field 52 of converter 13 and common field 53 of converter 13. When both field loss relay coils $FL_1$ and $FL_2$ are energized, contactor FL picks up and main line relay coil M is energized, thus picking up main line contact $M_1$ and contact $M_2$ so that coil K will be unaffected by opening of contact $X_3$.

At this time electric power is supplied to converter brush terminals 18 and 19, and converter shunt fields 52 and 53 are energized from current flow through transistor 78 from line 11 to line 12. Therefore, converter 13 is driven as a motor by electric power applied across brush terminals 18 and 19. Relay coils $FL_1$ and $FL_2$ hold field loss contact FL closed and coil M energized. It will be noted that if there should be a loss of shunt field excitation on poles 14 or 15 due to fields 52 or 53 opening, either relay $FL_1$ or $FL_2$ would become deenergized and drop out contact FL, which would deenergize coil M causing main line contact $M_1$ to open to break the converter motoring circuit and also contact $M_2$ to open deenergizing coil K, which would open contact $K_2$ and interrupt power to the control circuits connected to line 11.

To accelerate the vehicle in the forward direction, the operator now moves the selector switch X to the "forward" position. At this time, contacts $X_3$ and $X_4$ open, and contacts $X_5$ and $X_6$ close under control of the selector switch. When contact $X_5$ closes, forward relay coil F between terminals 62 and 63 is energized and contact $F_1$ picks up and contact $F_2$ drops out, thus establishing a circuit path through motor 26 from generating brush 22 of converter 13, terminals 24 and 25 of the armature of motor 26, and series field 32 on pole 14 to line 12. Now the contact arm 57 of potentiometer 56 is connected to terminal 59 of converter control field 60 through contactor $F_3$ and $X_6$, contactor $F_4$ being open, and as the contact arm 57 is moved to a point of higher voltage, current through transistor 72 increases in control field 60 and also common field 53 in a direction to increase the flux from control pole 16 to common pole 15. As the excitation of control field 60 is increased, voltage generated across converter brush terminals 22 and 19, and therefore the voltage across traction motor 26 increases to accelerate the motor and the vehicle. By movement of potentiometer arm 57, the vehicle operator may thus control the speed of the vehicle.

It will now be apparent that by initially moving the selector to "reverse" instead of "forward," circuit operation would occur to close contacts $X_1$, $X_2$, $X_7$ and $X_8$ to energize motor field 40, energize reverse relay R to close contacts $R_1$, $R_3$ and $R_6$, open contacts $R_2$, $R_3$ and $R_4$ and establish a circuit through the armature of motor 26 from terminal 25 to terminal 24 and upon energization of control field 60 accelerate the vehicle in the reverse direction.

Regenerative Braking

Assume now that potentiometer arm 57 is set for maximum forward speed of the vehicle and the operator wishes to stop or slow down the vehicle. The contact arm 57 is moved clockwise to decrease the excitation of control field 60 and the voltage across converter terminals 22 and 19 decreases. However, the motor 26 is driven by the inertia of the vehicle and through generator action, a voltage is generated across armature terminals 24 and 25 and the motor will supply regenerative energy to converter terminals 22 and 19. The reverse series field 37 of motor 26 carries the regenerative current to the converter. The reverse series field 37 is selected with ampere turns cumulative to those of motor shunt field 40 to prevent the regenerative current from motor 26 from "knocking down" the shunt field, as would be the case if only the series field 27 were provided for both motoring and braking.

In accordance with an aspect of the invention, to provide smooth braking a cumulative series field 39 is provided on the converter 13 which provides programmed regenerative braking. Braking field 39 is in series with motor series field 37 and is cumulative with respect to converter shunt fields 52, 53 and 60.

Assume first that series field 39 is not provided. If the vehicle operator removed his foot from the speed control pedal (thereby bringing potentiometer contact arm 57 to zero setting), a surge of current would flow out of the battery and cause the vehicle to stop abruptly and unevenly. Reference is now made to FIG. 4, which shows the output characteristic of converter 13 without series field 39. It will be noted that at low voltage the characteristic is rising. This rising characteristic at low voltage produces a negative characteristic upon braking. It will be seen that when motor current reverses, the voltage at output terminals 22 and 19 goes negative, thereby demanding power from the battery and also circulating a very large current in the motor loop comprising motor 26, converter terminals 22, 19 and converter series field 32.

Although this results in the fastest stop, it is undesirably abrupt and drains rather than regenerates the battery. On the other hand, if the counter electromotive force of the converter with regenerative energy applied to terminals 22, 19 came right back up to motor voltage (when driven as a generator) whenever current flowed from motor 26 to terminals 22, 19, there would be no regenerative braking and the vehicle would coast.

To overcome this, the programming regenerative braking field 39 is applied to converter 13 to provide different converter characteristics in braking than in motoring. The series field 39 is selected to increase the converter voltage as motor regenerative current $I_b$ flows in field 37 and produce the converter characteristics shown in FIG. 5. Now if the vehicle is moving forward and the operator calls for zero speed, the regenerative current $I_b$ will increase only until the converter voltage comes up to match the motor voltage, gradually decreasing as the truck slows down. The voltage applied across converter terminals 22 and 19 by motor 26 drives converter 13 as a motor and causes a voltage to be generated across converter terminals 18 and 19 which supplies regenerative power to battery 10. The positive voltage and negative current of the converter represent real power available to be pumped back to the battery 10. The braking effect can be adjusted to any desired feel by selection of the turns of or by shunting field 39.

In one application of the invention, a motor current of 1200 amperes corresponded to the power required to climb the steepest grade specified. The programmed regenerative braking field 39 was selected to bring the converter counter electromotive force (when driven as a motor from terminals 22, 19) all the way back to full output voltage (approximately 90 volts) when 1200 amperes braking current flowed from motor 26 to terminals 22, 19. This gave adequate hold-back torque when the vehicle was descending grades, but still provided good regenerative braking under driving conditions.

Figure 5:
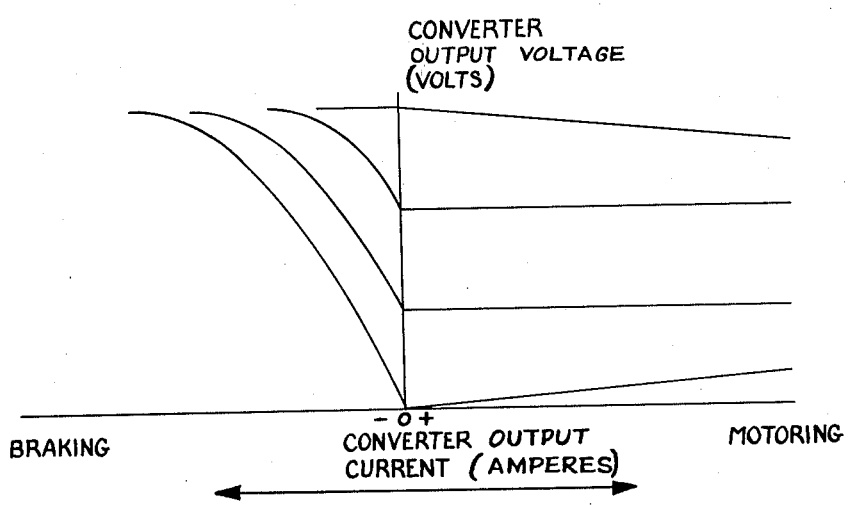

In FIG. 5, it will be noted that as regenerative current flows from the motor to converter terminals 22, 19, the back voltage of the converter rises now at a programmed rate which will provide smooth regenerative braking of the vehicle. The converter during vehicle braking, of course, supplies energy to battery 10 through terminals 18 and 19. The converter series field 39 carries the regenerative current of the traction motor 26 and therefore predetermines the excitation of converter 13 in regeneration in accordance with the current supplied from the traction motor, and hence the traction motor voltage and speed. It may thus be seen that the regenerative braking of the vehicle is programmed as a function of braking current.

Anti-Plugging

Assume now that the vehicle is in motion and the operator wished to rapidly stop the vehicle and reverse direction of motion and throws the selector handle, FIG. 2, from "forward" to "reverse." Normally such operation of vehicle controls would reverse the connection of the traction motor armature, placing the counter electromotive force (C.E.M.F.) of the traction motor in series with the battery and cause a large circulating plugging current which would impose a high braking torque on the vehicle and possibly damage the motor due to the large current. In accordance with an aspect of the invention, a new and improved anti-plugging arrangement is provided which prevents reversal of the traction motor circuit until the vehicle speed has decreased to a predetermined value.

When the operator moves his selector switch from "forward" to "reverse," it will be noted that contactors $X_5$ and $X_6$ are opened and contactors $X_7$ and $X_8$ are closed. It will be seen that opening of $X_5$ and closing of $X_7$ would normally cause forward relay coil F to become deenergized and reverse relay coil R to become energized, which would open contacts $F_1$ and $R_2$ and close contacts $R_1$ and $F_2$ to reverse the direction of current flow in the armature of traction motor 26. However, speed-sensing relay coil S, which measures motor C.E.M.F. and hence motor speed, maintains contactor $S_1$ closed, which provides a circuit through contactor $F_6$ about contactor $X_5$ to provide a path for energizing current to flow through forward relay coil F and thus maintain the motor armature circuit in the forward direction. Even though contactor $X_7$ closes, contactor $F_5$, which is in series with reverse relay coil R, and which may be an interlock on contactor $F_2$, remains open and reverse relay coil R may not become energized. When $X_6$ opens, control field 60 of converter 13 becomes deenergized and no power is supplied to traction motor 26. Traction motor 26 therefore operates as a generator delivering regenerative power to brushes 22 and 19 of converter 13 through the motor series field 37 and converter regenerative braking series field 39, as heretofore described. Therefore, the motor load is taken off of converter 13, which is now driven as a motor by the counter E.M.F. of traction motor 26 and electric power will be generated across the terminals 18 and 19 of converter 13 which will charge battery 10.

When the speed of the vehicle and hence the generated voltage of motor 26 decreases to a predetermined value insufficient to hold relay coil S energized, contact $S_1$ will open. When contact $S_1$ opens, forward relay F becomes deenergized. This closes contact $F_5$ and allows reverse relay R to become energized between terminals 64 and 65. When reverse relay R is energized, contactor $R_1$ closes and contactor $R_2$ opens, thus providing a current path through motor 26 from terminal 25 to 24. Also contact $R_3$ closes connecting contact arm 57 of potentiometer 56 through contact $X_8$ to terminal 59 of control field 60, thereby causing a voltage to be generated between brushes 22 and 19 and electrical energy supplied to traction motor 26. The motor 26 will now accelerate, to a speed determined by the setting of potentiometer contact arm 57, in the reverse direction.

Therefore, it may be seen that if the vehicle operator attempts to reverse the direction of the vehicle while it is in motion above a predetermined speed, the vehicle is automatically regeneratively braked until the vehicle speed decreases to the predetermined value. The predetermined speed at which the motor circuits may reverse is selected in accordance with the setting of tap 30 on potentiometer 29.

*Power Peaking*

Figure 6:
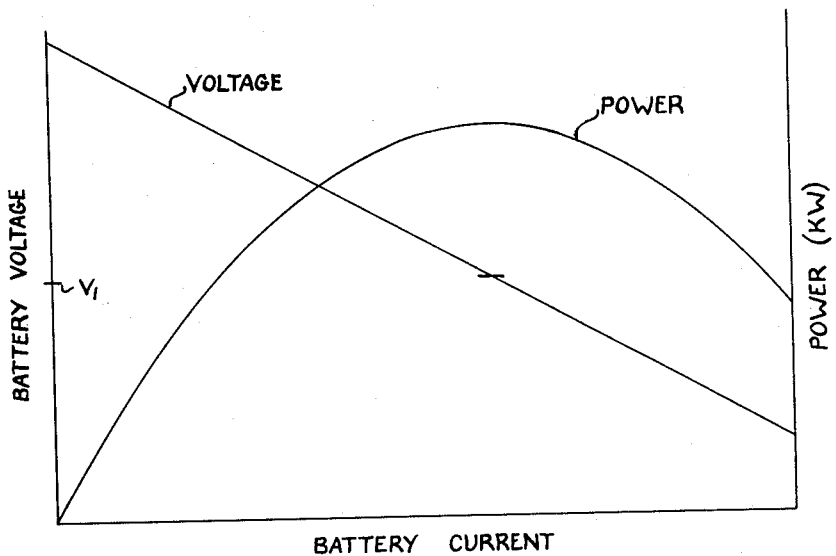
FIG. 6 illustrates the voltage and power characteristics of a typical electric battery of the type used in battery powered vehicles.

FIG. 6 shows the regulation and output power versus current for a typical storage battery of the type used in battery-electric vehicles. It will be noted that the power output curve reaches a maximum at about one half the open circuit battery voltage. Inasmuch as the use of the rotating D.C. converter 13 provides an adjustable "transformer ratio" between the battery and the motor, it is possible to accelerate or grade climb at the peak power point of the battery independent of speed and thus more efficiently utilize the battery.

If the vehicle should be heavily loaded or contact arm 57 of potentiometer 56 be advanced to accelerate the vehicle, the battery voltage decreases with current demand on the battery as represented by the voltage curve of FIG. 6. As battery voltage decreases beyond point $V_1$, FIG. 6, Zener diode 73, FIG. 1, ceases to conduct and transistor 72 will be turned off. This places resistance 58 in electrical series with the resistance of potentiometer 56. This reduces the voltage applied to control field 60, which reduces the output voltage of the converter and thereby reduces the demand on the battery. As the battery voltage now rises to a value greater than $V_1$, FIG. 6, Zener diode 72 will again break down causing transistor 72 to shunt resistance 58, increase the voltage on control field 60 and demand more power from the battery. The Zener diode 73, when conducting together with series resistance 75, regulates the current bypassed around resistance 58 and hence the voltage at contact 57 to maintain the load on the battery 10 at the point where the battery will deliver its peak power. In this manner the demand on the battery is regulated at its maximum power point and the battery is most efficiently utilized.

*Battery-Charging and Over-Voltage Protection*

It will be noted that when the vehicle is not in duty, battery 10 may be charged by the converter driven by a motor 85 which may be an A.C. motor connectable to any suitable source of A.C. power. When the selector switch of FIG. 2 is placed in the "charge" position, contacts $X_1$, $X_2$, $X_3$ and $X_4$ are closed. Closing of contact $X_3$ with control switch 45 closed energizes relay coil K which picks up contacts $K_1$ and $K_2$ to energize coil M and close main line contact $M_1$. It will be noted that with this circuit arrangement there is no current path through the motor armature nor any field on the motor. Fields 52 and 53 of converter 13 connected across lines 11 and 12 will be energized and as converter 13 is driven by motor 85, a positive voltage will appear at brush terminal 18 effective to supply a charging current to battery 10. When battery 10 has charged to a predetermined value, Zener diode 82 in the base 83—emitter 84 circuit of transistor 81 will break down allowing current to flow through the emitter 84—collector 80 circuit of transistor 81 and establish a bias in the turn-off direction on base 79 of transistor 78 to thereby regulate the current through transistor 81 and also resistance 51. In this manner the excitation of fields 52 and 53 are regulated to provide a constant voltage output from terminals 18 and 19 of converter 13 to charge battery 10. When transistor 78 is fully turned off, there will be insufficient current through resistance 51 and relay coils $FL_1$ and $FL_2$ to maintain contact FL closed. When contact FL opens, coil M is deenergized and main line contact $M_1$ opens to disconnect the converter from the battery and cease charging of the battery. It may also be noted that during charging when contact $X_4$ is closed, current flows from terminal 49 through motor field 52 and through both control field 60 and common field 53 to provide excitation for the converter which at this time acts solely as a generator.

An additional advantage of an electric vehicle system embodying the invention is that where the invention is utilized in a lift truck, the hydraulic lift pump 86 may be clutched to the converter shaft by means of a clutch 87, operable by the vehicle operator, and directly driven by the converter shaft and thereby eliminate the need for a pump motor, inasmuch as during operation of the vehicle the converter shaft is always turning.

Figure 7:
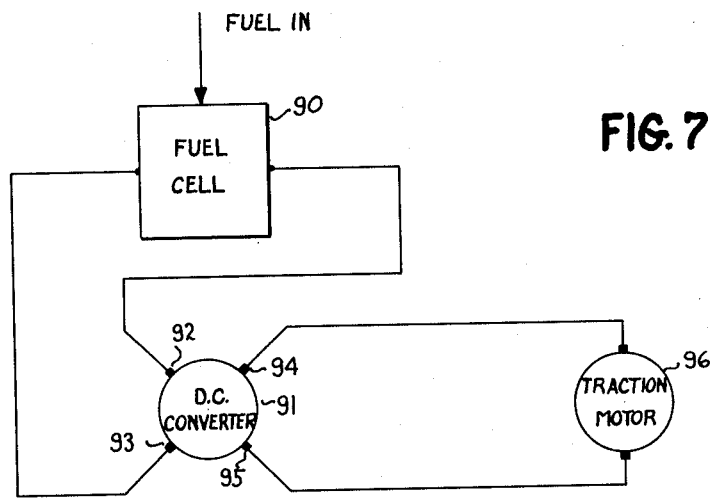
FIGS. 7 and 8 illustrate embodiments of the invention utilizing a fuel cell as a source of power.

It is to be understood that the electric vehicle system disclosed is not limited to use of a battery as the source of electric power. The source of electric power could be a fuel cell, which chemically converts a fuel to electric power, connectable across the input terminals 18 and 19 of the converter 13, as illustrated in FIG. 7. FIG. 7 illustrates as a self-carried source of power a fuel cell 90, which supplies electrical energy to rotary direct current voltage converter 91. Converter 91 is illustrated as a more conventional four-terminal machine having input or motoring terminals 92, 93 and output or generating terminals 94, 95, which supply a variable voltage to traction motor 96. The arrangement of FIG. 7 contemplates that fuel cell 90 is of the ion exchange membrane type which is capable of accepting regenerative energy. In applications such as FIG. 8, where a fuel cell 97 not capable of accepting regenerative energy is utilized as the source of electric power, a small battery 98 might be connected in parallel with the fuel source to provide a receptive source for accepting regenerative energy from the converter and thereby utilize the advantages of regenerative braking of the invention. Also the battery 98 provides an additional source of energy to help supply load peaks on the vehicle and for this reason might also be provided in the arrangement of FIG. 7.

Figure 8:
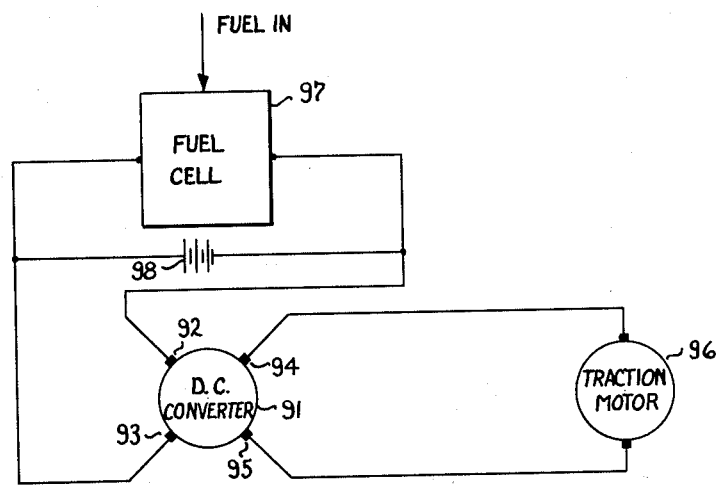

It may thus be seen that an electric vehicle system utilizing a rotary D.C. converter possesses many advantages over an electric vehicle utilizing series resistance to control the voltage applied to a traction motor. It is to be understood that this invention is not limited to the use of a converter having 3p poles, as specifically described, inasmuch as a more conventional converter having 2p poles could be utilized, as illustrated in FIGS. 7 and 8. The converters 91 of FIGS. 7 and 8 could be utilized with the same or substantially the same control circuitry of FIG. 1. The converter having 3p poles is considered preferable inasmuch as its efficiency as described by the ratio of its output power to input power is greater. This is primarily due to reduction of brush drop inasmuch as the 3p pole converter would use less brushes than a 2p pole converter. Any distinction between the two may be considered analogous to the distinction between a transformer and an autotransformer.

While the invention has been disclosed in one form thereof, other embodiments and modifications to the disclosed embodiments of the invention may occur to those skilled in the art which do not depart from the spirit and scope of the invention. It is therefore intended to cover in the appended claims all embodiments of the invention which do not depart from the spirit and scope of the invention.

What is claimed as new and is desired to secure by Letters Patent of the United States is:

1. An electric vehicle system comprising a source of electric power adapted to be carried by the vehicle; a rotating direct current converter having input terminals adapted to receive driving energy from said source, said converter having output terminals adapted to supply generated electric energy to a traction motor adapted to propel the vehicle; means including a control field on said converter for variably controlling the voltage at the output terminals of said converter to steplessly vary the voltage applied to said traction motor and hence the speed of the vehicle; and means for sensing the peak power output of said source of electric power and regulating the excitation of said control field to regulate the output of said converter whereby peak power output is obtained from said source of electric power.

2. The system of claim 1 wherein said source of power is a battery and a normally conductive Zener diode connected across the terminals of said battery senses the battery voltage at which peak power may be obtained and regulates the excitation of said control field to demand peak power from said battery.

3. An electric vehicle system comprising a source of electric power adapted to be carried by the vehicle; a rotating direct current converter arranged and adapted to receive driving energy from said source, supply generated electric energy to a traction motor adapted to propel the vehicle, and allow regenerative energy to be supplied to said source when the voltage generated by said traction motor exceeds the voltage at the output of said converter; means operatively associated with said converter for causing said converter to exhibit one current-voltage characteristic for currents of one polarity and a different current-voltage characteristic for currents of opposite polarity; and means including a control field on said converter for variably controlling the voltage at the output terminals of said converter to steplessly vary the voltage applied to said traction motor and hence the speed of the vehicle.

4. The system of claim 3 wherein said means operatively associated with said converter comprises a series field on said traction motor in series with a series field on said converter which fields carry current only when the motor voltage exceeds the voltage at said converter output terminals.

5. An electric vehicle system comprising a source of electric power adapted to be carried by the vehicle; a rotating direct current converter arranged and adapted to receive driving energy from said source, supply generated electric energy to a traction motor adapted to propel the vehicle, and allow regenerative energy to be supplied to said source when the voltage generated by said traction motor exceeds the voltage at the output of said converter; means operatively associated with said converter for causing said converter to exhibit one current-voltage characteristic for currents of one polarity and a different current-voltage characteristic for currents of opposite polarity; means including a control field on said converter for variably controlling the voltage at the output terminals of said converter to steplessly vary the voltage applied to said traction motor and hence the speed of the vehicle; operator control means for reversing the direction of current through said traction motor to reverse the direction of motion of said vehicle; and vehicle speed sensing means operative to prevent reversal of current in said traction motor as long as the speed of said vehicle is above a predetermined value.

6. The system of claim 5 wherein said speed-sensing means senses the counter electromotive force of said traction motor as a measure of speed.

7. The system of claim 5 which includes means effective upon actuation of said operator control means to automatically regeneratively brake the vehicle and to prevent reversal of motor current until the speed of said vehicle decreases to a predetermined value.

References Cited in the file of this patent

UNITED STATES PATENTS

| Re. 22,907 | Tyrner | Aug. 12, 1947 |
| 2,282,822 | Pestarini | May 12, 1942 |
| 2,539,987 | Burger | Jan. 30, 1951 |
| 2,741,731 | Pestarini | Apr. 10, 1956 |

FOREIGN PATENTS

| 613,516 | Great Britain | Nov. 30, 1948 |